Nov. 2, 1965   R. J. HENDERSON   3,215,163
TWO-POSITION, FOUR-WAY PILOT OPERATED VALVE
Filed June 23, 1964
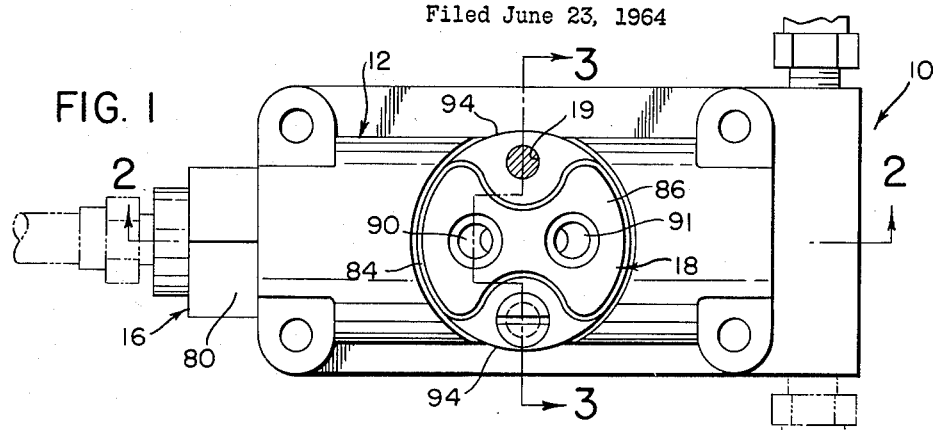
FIG. 1
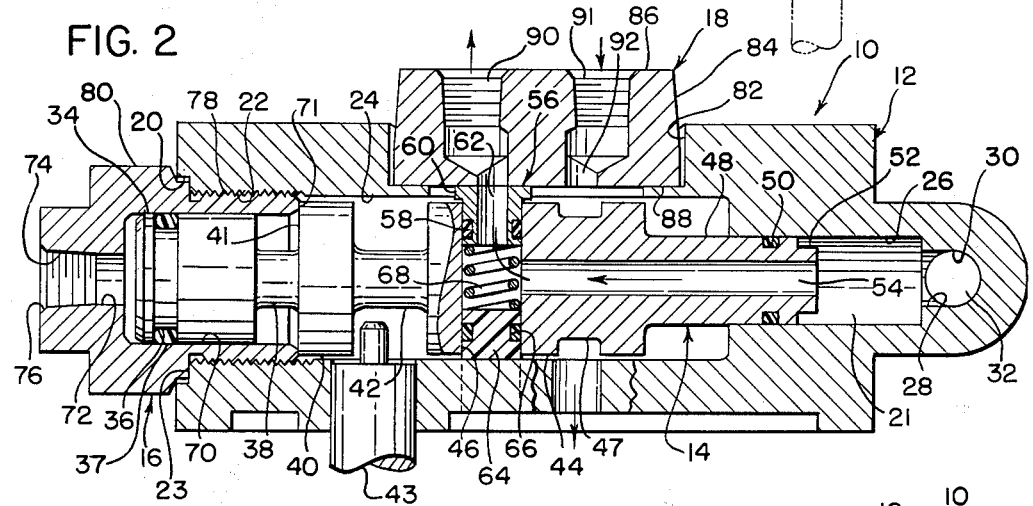
FIG. 2
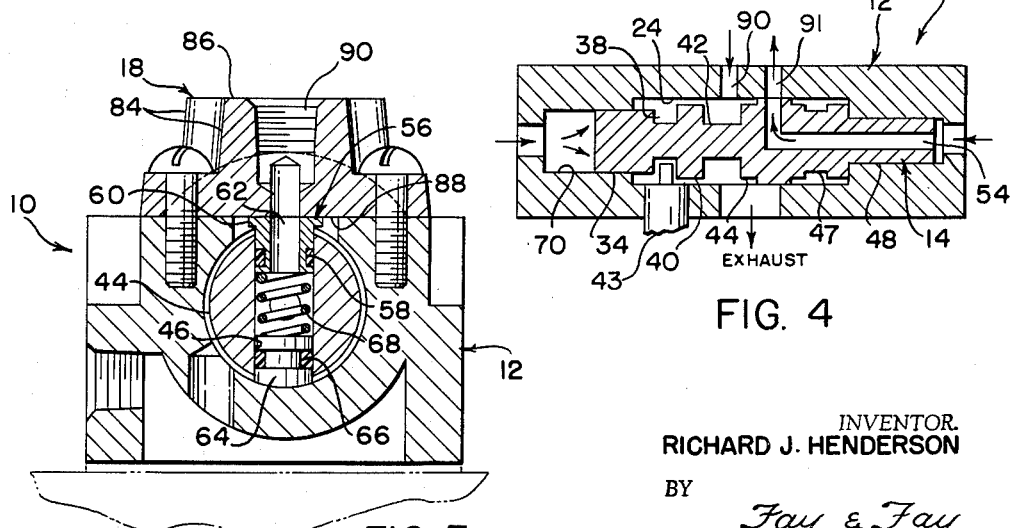
FIG. 3
FIG. 4
INVENTOR.
RICHARD J. HENDERSON
BY
*Fay & Fay*
ATTORNEYS

3,215,163
TWO-POSITION, FOUR-WAY PILOT OPERATED VALVE
Richard J. Henderson, Avon Lake, Ohio, assignor to Republic Manufacturing Company, Cleveland, Ohio
Filed June 23, 1964, Ser. No. 377,215
5 Claims. (Cl. 137—625.68)

This invention relates to valves, and more specifically to directional flow control valves.

In its broadest sense, this valve comprises a body having a substantially, axial, cylindrical passageway terminating in a passageway transverse thereto. An end cap with a stepped passageway therethrough is received threadedly in the larger diameter end of the passageway in the valve body. A flanged cap cylinder having two fluid passageways is fastened to the valve body. An opening in the valve body provides fluid connection between the passageways in the cap cylinder and the valve body. A substantially cylindrical valve spool of different diameters is received slidably in the longitudinal passageway of the valve body assembly. One end of the spool reciprocates in a co-operating portion of the stepped passageway in the valve body; the opposite end of the spool reciprocates in a co-operating bore in the stepped passageway in the valve body end cap. An axial passageway starting in the valve body end of the valve spool terminates in a transverse, diametral passageway within the spool. A balance plug and a flanged seal are received slidably in the transverse passageway. The balance plug and flanged seal are held separated by an intermediate spring which urges the balance plug and flanged seal away from each other. The balance plug of this novel structure holds the valve spool in a balance force relation. It also provides a low friction reaction force when the valve spool is slidably operated within the valve housing to direct fluid to the desired fluid passageway in the cap cylinder.

In a preferred embodiment of the invention, a resilient, resinous material such as polytetrafluoroethylene (Teflon) is used for the balance plug, and stainless steel for the flanged seal. The Teflon balance plug provides a sliding structure having low friction, a great resistance to wear, and chemical stability.

The use of directional flow control valves for directing the flow of fluids is by no means new, but has presented a great many problems in the past. Those skilled in the art know that valves with spool-type controls have been used for many years for directing fluids under pressure from a source of supply to co-operating passageways or ports. Those skilled in the art further know that one of the major design requirements for operating flow control valves is the need for leaktight operation with minimum frictional forces. In the past, one of the major problems with these type valves has been their inherently high frictional resistance forces and the need to provide large input, actuating force to move and slide the valve spool in the valve bore with the desirable amount of control. The reason for the high friction and high actuating forces has been inadequate design calling for the use of unsatisfactory sealing means between the fluid passageways. In order for a spool valve to perform satisfactorily when supply fluid is transferred or shifted from one port to another, the diametrical clearances between the spool and bore must be sealed. This is usually accomplished with elastomeric seals such as O-rings. This design feature is the very cause of failure of many spool valves.

During operation, the O-rings are subjected to undue wear, twisting, aging and possible extrusion. The reciprocal sliding motion of the spool tends to wear the periphery of the elastomeric seal. Spiral failure of the elastomeric seal may further cause improper operation of the valve.

As the spool reciprocates in the bore, the O-ring must leave the close fitting body diameter and enter an open area. The elastomeric seal tends to follow the increasing gap and expands or blows out of its retaining groove. Furthermore, where clearances are excessive or system pressure high enough, the elastomeric seal may tend to extrude through the clearance gap and allow fluid to leak. The continuous, reciprocal travel of an elastomeric seal past a sharp-edged port tends to cut and abrade the seal and contribute to its failure, valve leakage and overall system contamination.

No previous design has been able to produce a valve that could be operated easily, efficiently, and accurately without requiring large operating forces to overcome the large frictional forces between the spool and its mating passageway. In quest for improved, more accurate, easier, and functional performance, the desirability for structural simplicity has not been overlooked. This valve provides accurate, reliable, economical, and easy-to-operate means long sought by the industry.

The port-sealing method used in the design of the slide in this valve eliminates the sealing problems often encountered with elastomeric seals where these must travel past sharp-edged ports. This design eliminates the problem of an O-ring blowing out of its groove, extruding or otherwise failing.

The most important aspect of this valve is that it provides an easy, force-balanced, and economical means for shifting a spool within a directional flow control valve with relatively small actuating forces, while providing leaktight, highly reliable, accurate performance. This force-balanced design prevents unbalanced forces from acting on the valve spool which may cause the valve spool to bind in the passageway and impair the proper operation of the valve. In addition to its balanced-force feature, this design gives the valve reliable operation and a proper, uniform wear pattern which is required for dependable, accurate operation. The use of a low friction, self-lubricating sealing component greatly reduces the forces required to operate the valve, while increasing reliability and dependability.

With the problem of the prior art devices in mind, it is a general object of the invention to provide an improved, directional control valve for directing the flow of pressure fluids.

It is a more specific object of this invention to provide a directional control valve which will be economical to mass produce.

It is another object of this invention to provide a valve in which the fluid-transmitting valve spool is leaktight, yet operates slidably within a bore with a maximum of ease and a minimum of friction.

It is another object of this invention to provide a directional flow control valve having balanced fluid power forces.

It is still another object of this invention to provide a valve that has no unbalanced forces acting on the valve spool which would tend to cause the spool to bind and impair the proper operation of the valve.

It is another object of this invention to provide a valve that has no unbalanced forces acting radially on the spool, thus the spool may be actuated with the smallest possible axial force.

It is another object of this invention to provide a valve with an uninterrupted and continuous flow passage to the actuator to which it is connected.

It is a further object of this invention to provide a valve that is compact, and includes all necessary fluid connecting means.

It is a further object of this invention to provide a valve with minimum pressure drop flow characteristics.

It is a further object of the invention to provide a valve which is reliable and foolproof.

It is another object of this invention to provide a valve that can be actuated remotely.

It is a further object of the invention to provide a valve with a lockout mechanism which prevents the valve from being shifted inadvertently.

Other and further objects of the invention will be apparent from the detailed description to follow.

Broadly, the invention contemplates a two-position, four-way directional flow control valve for directing the flow of pressure fluid from a source of pressure fluid supply through selected passageways.

More particularly, this invention contemplates a directional flow control valve that provides an economical, reliable, and easy-to-operate means for reciprocating a spool within the body of a valve assembly.

It is another contemplation of this invention to provide a valve using low friction sealing means which operate in a state of fluid pressure balance and provide leaktight performance.

In the drawings:

FIG. 1 is a top view of the four-way, pilot-operated, directional control valve;

FIG. 2 is a longitudinal section of the valve structure;

FIG. 3 is a sectional view taken along line 3—3 in FIG. 1; and

FIG. 4 is a diagrammatical representation of the valve showing the flow path of fluid into and through the valve.

Referring now more particularly to the drawings, where like numerals are used throughout for like parts in the several views.

In the illustrated, preferred embodiment of the invention, a valve assembly 10 is shown which embodies the essential principles of the invention. The valve 10 comprises a body 12, a valve spool assembly 14, an end cap 16, and a cap cylinder 18. The valve body 12 has an axially disposed, substantially cylindrical stepped passageway 21 therethrough. At one end of the cylindrical passageway 24 is a radial counterbore 20 connected to a threaded portion 22 of smaller diameter through the radial surface 23. Thread 22 terminates in a cylindrical passageway 24 of diameter slightly smaller than that of thread 22. Passageway 21 is of internally stepped configuration as a result of two counterbores 26 and 28, both concentric with bore 24. Counterbore 28 terminates in a transverse passageway 30 having at each end of the passageway threads 32.

The spool 14 is generally cylindrical and of varying diameters. The valve spool 14 has at one end a cylindrical, peripheral area 34, interrupted by a smaller diameter groove 36, comprising sealing means 37. Groove 38 separates surface area 34 from surface area 40. Peripheral area 40 connects to a groove having a smaller diameter 42 which is of equal magnitude as 38. A mechanical interlock 43 is shown engaged in groove 42. Groove 42 connects to a substantially larger peripheral diameter 44, which is substantially the same size as the peripheral area 40. The transverse passageway 46 connects opposite, diametrical edges of the peripheral area 44. Area 44 is interrupted by a groove 47. The spool 14 terminates in a small diameter 48, interrupted by a sealing groove 50, and terminating in a diameter 52. An axial passageway 54 starting at the end 21 of spool 14 terminates in the transverse passageway 46, forming a generally L-shaped passageway.

The flanged seal 56 is substantially cylindrical with a sealing groove 58 on its outside periphery and a flange 60 that co-operates with surface 88 of cylinder cap 18. Flanged seal 56 has an axial hole 62 therethrough. A seal balance plug 64 is substantially cylindrical and has its outer periphery interrupted by a sealing groove 66. A compression spring 68 is intermediate the balance plug 64 and flanged seal 56 exerting a force tending to urge the flanged seal 56 and balance plug 64 away from each other.

The end cap 16 is generally cylindrical, with a substantially cylindrical passageway 70 therethrough. Passageway 70 is of internally stepped configuration as a result of a concentric counterbore 72, which terminates in a thread 74 and chamber 76. Counterbore 70 is dimensioned to receive slidably and snugly the peripheral surface area 34 of valve spool 14. At the open end, bore 70 terminates in a radial, externally divergent annulus which terminates in a radial surface 71. Annular area 41 abuts against annular surface 71 when the valve spool is in one extreme position. At one end, the outer periphery of cap 16 has a thread means 78 which is operatively received into thread means 22 of valve body 12. The outside of cap 16 has suitable means for advancing it along the threads 22 of valve body 12. In the illustrated embodiment, the cap includes tool pads for advancing the cap using conventional tools.

A generally circular opening 82 in the valve body 12 receives the cap cylinder 18. Suitable holes 19 in cap 18 permit connecting the cap cylinder to the valve body. The top surface 86 of cap cylinder 18 is of smaller diameter than the bottom surface 88. Two passageways 90 connect surface 86 with surface 88. Each passageway has a thread means to effect a fluid connection, and a connecting passage 92 eccentric to the center of the threaded holes. The configuration of cap cylinder 18 is such as to provide two mounting pad type flanges 94 to accommodate the connecting means to the valve body.

FIG. 4 is a schematic diagram of the valve which shows its operation. Pilot pressure fluid is applied through the port at the extreme left end, and system pressure fluid is applied through the port at the extreme right end. Fluid at system pressure flows through the L-shaped passageway in the valve spool, leaving the valve through port 91. When operating conditions require it, the mechanical lockout 43 retracts, the force exerted by system fluid exceeds that exerted by pilot fluid, shifting the valve spool to the left. The mechanical lockout 43 reengages, holding the spool in its shifted position, and aligning the L-shaped passageway in the valve spool with port 90 in the cylinder cap.

For ease of description, the principles of the invention have been set forth in connection with but a single illustrated embodiment, showing a valve spool received slidably and snugly in an axial bore in a valve housing, with proper porting arrangements to allow the flow of fluid to be unrestricted into the proper channel. It is not our intention that the illustrated embodiment, nor the terminology employed in describing it be limiting, inasmuch as a variation in these may be made without departing from the spirit of the invention. Rather, we desire to be restricted only by the scope of the appended claims.

What is claimed is:

1. A valve comprising a body having a stepped, longitudinal passageway, said passageway being open at one end and terminating into a transverse passageway at the other end, said open end of the passageway receiving an end cap having a stepped passageway therethrough, said valve body and end cap having means for receiving fluid connections, said valve body having a suitable opening for receiving a cylinder cap having co-operating fluid passages, said passageway in the valve body receiving a valve spool member having peripheral areas forming peripheral grooves between the peripheral areas, said spool member being received slidably in the valve body and end cap passageways, said spool member having a longitudinal fluid passageway starting at one end of the spool and terminating in a passageway transverse thereto, said transverse passageway receiving a substantially cylindrical balance plug and flanged seal, a spring intermediate the balance plug and flanged seal urging these in opposite directions, said flanged seal co-operating with a mating surface on the underside of said cylinder cap and having an axial passage aligning with the fluid passages in the cylinder cap when the valve spool is actuated, said balance plug sliding along the passageway in the valve body, providing means for balancing the forces acting on the flanged seal, eliminating any unbalanced forces which may tend to act on the valve spool and which may tend to create force reactions which affect the efficient, slidable, reciprocal movement of the valve spool within the valve.

2. A valve as in claim 1, wherein the balance plug is made of a resilient, resinous material.

3. A valve as in claim 1, wherein the balance plug is made of polytetrafluoroethylene (Teflon).

4. A valve as in claim 3, wherein the flanged seal is made of 440 heat treated stainless steel.

5. A valve as in claim 1, wherein a lock mechanism in said valve moves into the passageway holding the valve spool in position and is actuated remotely.

References Cited by the Examiner
UNITED STATES PATENTS

| | | | |
|---|---|---|---|
| 2,593,733 | 4/52 | Davies | 251—175 X |
| 2,940,476 | 6/60 | Schultz | 137—625.18 X |
| 2,972,357 | 2/61 | Ford et al. | 251—175 X |
| 3,032,065 | 5/62 | Jolley | 137—625.68 |

MARTIN P. SCHWADRON, *Primary Examiner.*